United States Patent
Arakawa et al.

(10) Patent No.: US 9,465,730 B2
(45) Date of Patent: Oct. 11, 2016

(54) FLASH MEMORY DEVICE

(75) Inventors: Kazunori Arakawa, Aichi (JP); Tetsuya Egawa, Aichi (JP); Hidekazu Adachi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 463 days.

(21) Appl. No.: 13/461,171

(22) Filed: May 1, 2012

(65) Prior Publication Data

US 2012/0290770 A1 Nov. 15, 2012

(30) Foreign Application Priority Data

May 13, 2011 (JP) ................................ 2011-108380

(51) Int. Cl.
*G06F 12/02* (2006.01)

(52) U.S. Cl.
CPC ... *G06F 12/0246* (2013.01); *G06F 2212/7209* (2013.01)

(58) Field of Classification Search
None
See application file for complete search history.

(56) References Cited

U.S. PATENT DOCUMENTS

| 7,634,626 B2 * | 12/2009 | Arakawa ............. G06F 11/2071 711/112 |
| 2008/0120488 A1 * | 5/2008 | Woo et al. ...................... 711/209 |
| 2010/0325523 A1 * | 12/2010 | Slyz et al. ...................... 714/773 |

FOREIGN PATENT DOCUMENTS

| JP | 09-134312 | 5/1997 |
| JP | 2003-216511 | 7/2003 |
| JP | 2006-323499 | 11/2006 |

OTHER PUBLICATIONS

Japan Office action, mail date is Jan. 28, 2014.

* cited by examiner

*Primary Examiner* — Charles Rones
*Assistant Examiner* — Ryan Dare
(74) *Attorney, Agent, or Firm* — Greenblum & Bernstein, P.L.C.

(57) ABSTRACT

Different block management values that sequentially increase are set for a plurality of blocks to indicate active states of the blocks. For example, a first block management value "$1111" is stored in a first block, and a second management value "$1112" is stored in a second block. Thus, even when more than one block is in an active state, an updated value is read from the block that stores a larger block management value. This allows for the true updated value to be read.

9 Claims, 3 Drawing Sheets

FLASH MEMORY DEVICE

CROSS-REFERENCE TO RELATED APPLICATIONS

This application is based upon and claims the benefit of priority from prior Japanese Patent Application No. 2011-108380, filed on May 13, 2011, the entire contents of which are incorporated herein by reference.

BACKGROUND OF THE INVENTION

The present invention relates to a flash memory device.

A flash memory device manages a memory region in blocks to shorten the time for reading data (refer to, for example, Japanese Laid-Open Patent Publication No. 9-134312). A block management value is added to each block. The block management value is information indicating whether the corresponding block is in a used state (active state) or unused state.

As shown in FIG. 4, a block management value is formed by a four-digit number of the hexadecimal system. More specifically, "$1111" is allocated as the block management value in an active state, and "$FFFF" is allocated as the block management value in a non-used state. In the description hereafter, a number following "$" is a hexadecimal number.

A flash memory device will now be described with reference to the upper part of FIG. 4, which shows a first block in an active state and a second block in an unused state. The two blocks each include first to nth data areas A1 to An, which store data. The data areas A1 to An in the unused second block are all empty and do not include data. When there is a write request for data (updated value), updated values are sequentially written to the first to nth data areas A1 to An of the first block. This reduces the empty data areas. Then, as shown in the lower part of FIG. 4, when an updated value is written to the data area An of the first block, the block management value of the second block is rewritten from "$FFFF", which indicates an unused state, to "$1111", which indicates an active state, and the updated value is copied to the first data area A1 of the second block. Subsequently, the data stored in the first block is completely erased, and the block management value is rewritten from "$1111", which indicates the active state to "$FFFF", which indicates the unused state.

When an updated value is copied, the updated value may be renewed. In this case, the renewed updated value is written to the first data area A1 of the second block.

When an updated value is copied from the first block to the second block, the flash memory device may be reset when its power supply is temporarily deactivated. In this case, the first block is not switched to an unused state. Thus, when the power supply is activated again during the resetting, two blocks would be in an activate state, and the updated value becomes unknown.

In particular, during the copying of an updated value, renewal of the updated value would result in the updated values of the first and second blocks being different data. In this case, the true updated value is that of the second block. However, there is no means to recognize the true updated value. This may result in erroneously reading of the updated value of the first block.

It is an object of the present invention to provide a flash memory device that recognizes the true updated value.

SUMMARY OF THE INVENTION

One aspect of the present invention provides a flash memory device provided with a flash memory unit and a memory control unit. The flash memory unit includes a data region that stores data. The memory control unit forms a plurality of blocks, including a first block and a second block, in the data region of the flash memory unit. The memory control unit writes to the first block an updated value of the data and a first block management value indicating whether the first block is in a used state. When the first block is in an unused state, the memory control unit writes the updated value of the data and the first block management value to the first block. When the first block becomes full, the memory control unit copies the updated value of the first block to the second block and writes a second block management value to the second block. The memory control unit sets and writes a plurality of different block management values, including the first and second block management values, respectively, to the plurality of blocks based on a predetermined rule. The memory control unit reads a true updated value from one of the plurality of blocks based on the plurality of block management values.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3($b$) is a memory map showing the first and second blocks when the flash memory device is reset during the task of FIG. 3($a$)

DETAILED DESCRIPTION OF THE INVENTION

One embodiment of a flash memory device according to the present invention will now be described with reference to FIGS. 1 to 3.

Figure 1:
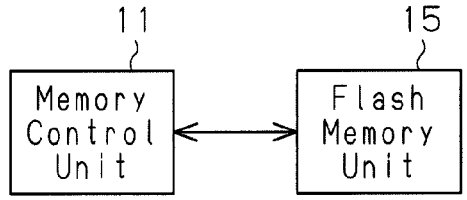
FIG. 1 is a diagram showing the configuration of a flash memory device.

As shown in FIG. 1, the flash memory device includes a memory control unit 11 and a flash memory unit 15, which is a non-volatile memory. The memory control unit 11 uses a data region of the flash memory unit 15 to manage updated values. The memory control unit 11 recognizes an updated value in accordance with information from an external device (not shown).

Figure 2:
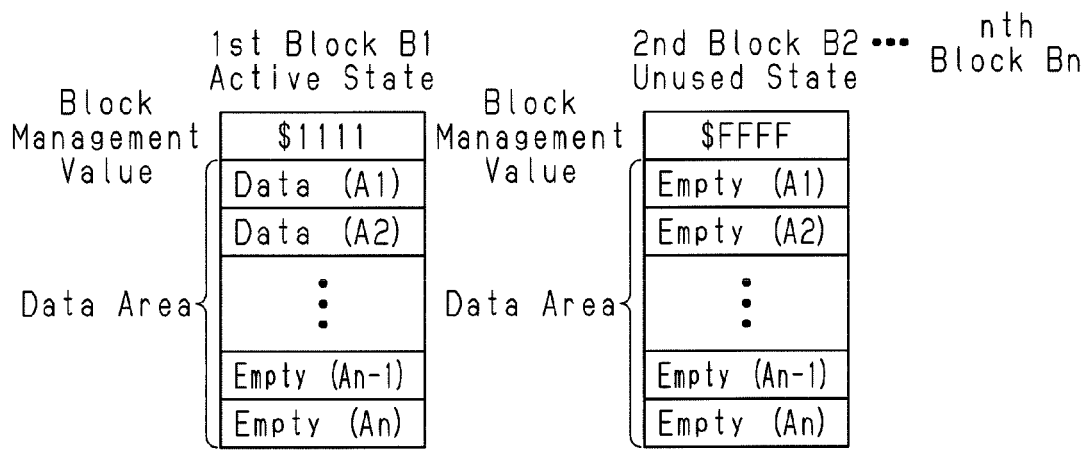
FIG. 2 is a memory map showing blocks and their block management values.
Figure 2:
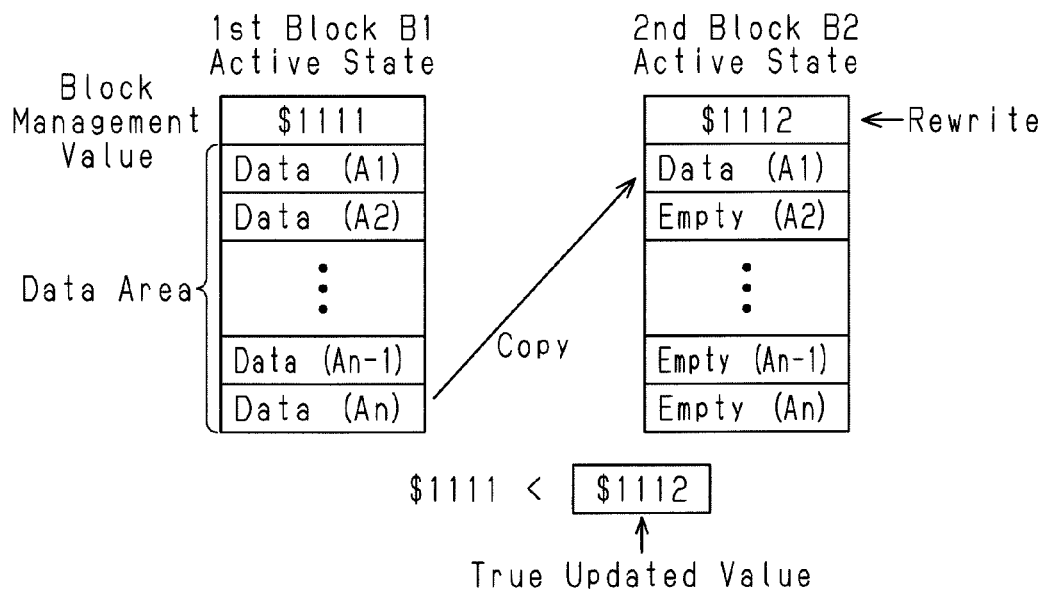

In detail, as shown in FIG. 2, the data region of the flash memory unit 15 is divided into a plurality of blocks B1 to Bn. The blocks B1 to Bn, respectively, include first to nth block management areas and first to nth data areas A1 to An.

A block management value is formed by a four-digit number of the hexadecimal system. More specifically, "$1111" to "$111F" are allocated as the block management value in an active state, and "$FFFF" is allocated as the block management value in a non-used state. In this example, "F" represents an initial state in which no information is added. In the same manner as the block management value, an updated value is formed by a number having a plurality of digits in the hexadecimal system.

The data areas A1 to An have the same data capacity. In a state in which each of the blocks B1 to Bn store no data, the memory control unit 11 writes "$FFFF" as the block management value in each block management area to indicate an unused state.

In this state, when recognizing an updated value, the memory control unit 11 writes the updated value to the first data area A1 of the first block B1 and rewrites the block management value stored in the first block management area from "$FFFF", which indicates an unused state, to "$1111", which indicates an active state. In the same manner, the memory control unit sequentially writes updated values to the second to nth data values A2 to An. Old updated values are not erased. Further, the first block management value stored in the first block management area is held as "$1111".

As shown in the lower part of FIG. 2, when an updated value is written to the nth data area An of the first block B1, the memory control unit 11 rewrites the block management value stored in the second block management area of the second block B2 from "$FFFF", which indicates an unused state, to "$1112", which indicates an active state. The second block management value of "$1112", which is stored in the second block management area of the second block B2 and indicative of an active state, is greater by "1" than the first block management value of "$1111", which is stored in the first block management area of the first block B1 and indicative of an active state. Further, the memory control unit 11 copies the updated value of the first block B1 to the first data area A1 of the second block B2. Then, the memory control unit 11 erases the data stored in the first block B1 and rewrites the first block management value stored in the first block management area from "$1111", which indicates an active state, to "$FFFF", which indicates an unused state.

In the same manner as the first block, when an updated value is written to the nth data area An of the second block B2, the memory control unit 11 rewrites the block management value stored in the third block management area of the third block B2 from "$FFFF", which indicates an unused state, to "$1113", which indicates an active state. Further, the memory control unit 11 copies the updated value of the second block B2 to the first data area A1 of the third block B3. Then, the memory control unit 11 erases the data of the second block B2 and rewrites the second block management value stored in the second block management area from "$1112", which indicates an active state, to "$FFFF", which indicates an unused state. Subsequently, in the same manner, when the fourth to nth blocks B4 to Bn are set to active states, the fourth to nth block management values of "$1114" to "$111F" are respectively written to the fourth to nth blocks B4 to Bn. In this manner, block management values indicating an active state are incremented by "1", or set in sequential numbers. In this example, when an nth block management value reaches "111F", the next first block management value returns to "$1111".

The memory control unit writes updated values up to an n−1th data area An-1 of the first block B1. When the next updated value is too large and cannot be stored in the nth data area An, this updated value is written to the second block B2. In this case, the first and second data areas A1 and A2 of the second block B2 are used. Then, in the same manner as described above, the memory control unit 11 erases the data stored in the first block B1 and rewrites the block management value stored in the first block management area from "$1111", which indicates an active state, to "$FFFF", which indicates an unused state.

After copying an updated value of a certain block to a data area of the next block, the block management value of "$FFFF", which indicates an unused state, is written to the block management value of the certain block. Thus, in the above configuration, basically, only one block is in an active state. This allows for the memory control unit 11 to read an updated value from the block that is in an active state.

However, when copying an updated value, the flash memory device may be reset when its power supply is temporarily deactivated. For example, in the case shown in the lower part of FIG. 2, the rewriting of the block management value has been completed for the second block B2 but not for the first block B1. Thus, two blocks are in active states.

Here, the block management values of the first to nth blocks B1 to Bn are set with sequential numbers as described above. Thus, if more than one block is in an active state when reading an updated value, the memory control unit 11 reads the updated value based on the greatest one of the block management values. For example, when the first block management value of "$1111" is written to the first block management area of the first block B1 and the second block management value of "$1112" is written to the second block management area of the second block, the second block management value of "$1112" is greater than the first block management value of "$1111". Thus, the memory control unit 11 reads the updated value of the second block B2, which corresponds to the second block management value of "$1112". As an exception of the above rule, in the present example, the first block management value of "$1111" comes next after the nth block management value of "$111F". Thus, the memory control unit 11 determines that the first block management value of "$1111" is greater than the nth block management value of "$111F".

Figure 3A:
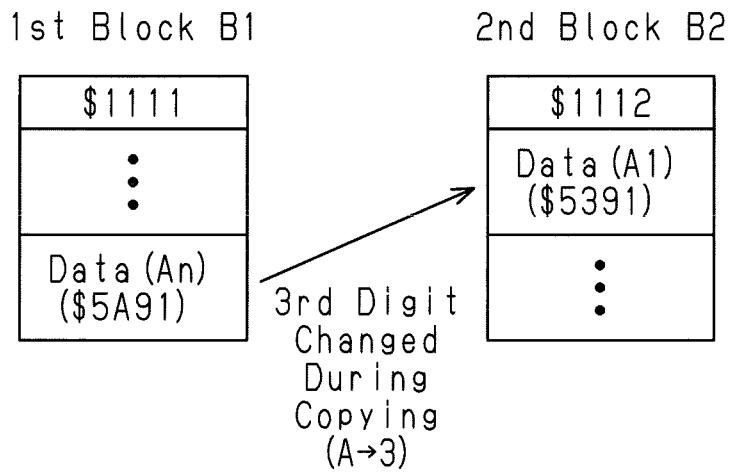
FIG. 3($a$) is a memory map showing first and second blocks when an updated value is renewed.

As shown in FIG. 3(a), when the updated value of the first block B1 is being copied to the second block B2, the updated value may be renewed. Here, the renewed updated value is referred to as a true updated value. When an updated value that is being copied is renewed, the memory control unit 11 writes the true updated value to the second block B2. In the example of FIG. 3(a), when copying the fourth digit of "5", if the memory control unit 11 recognizes that the third digit has been renewed from "A" to "3", the memory control unit 11 writes the renewed "3" to the third digit. As a result, the true updated value of "$5391" is written to the second block B2.

Figure 3B:
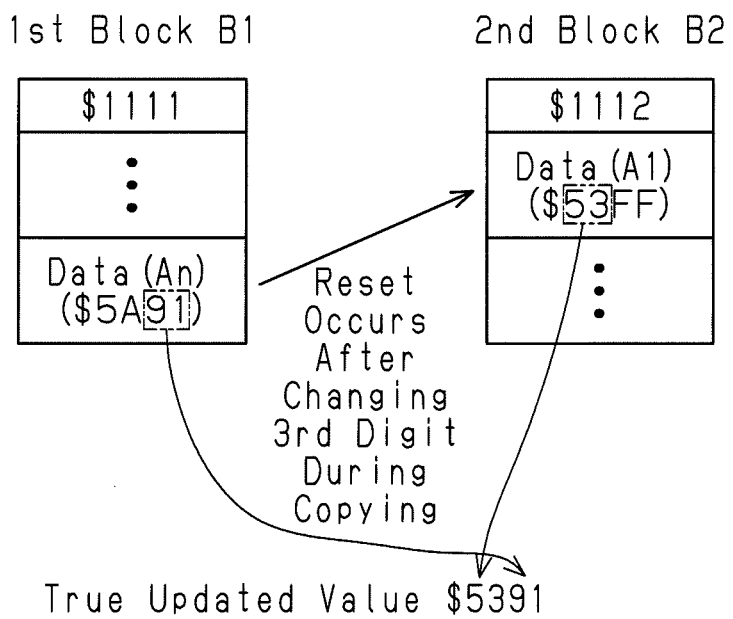
Figure 4:
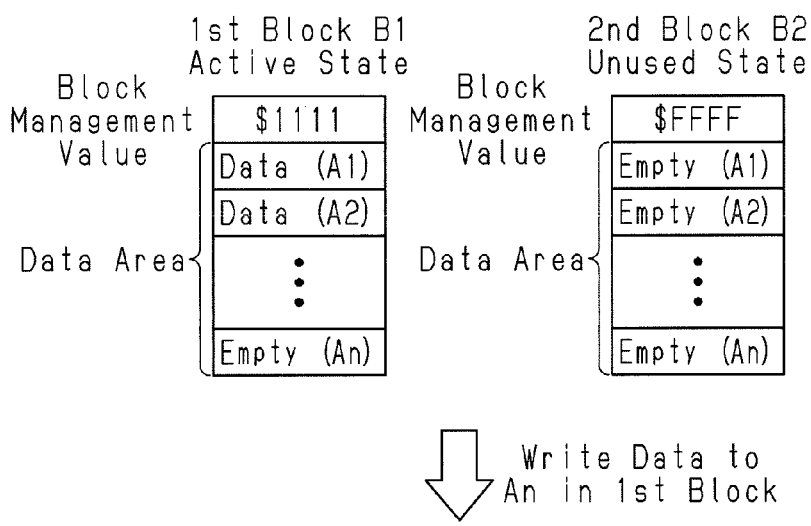
FIG. 4 is a memory map showing blocks in the prior art.
Figure 4:
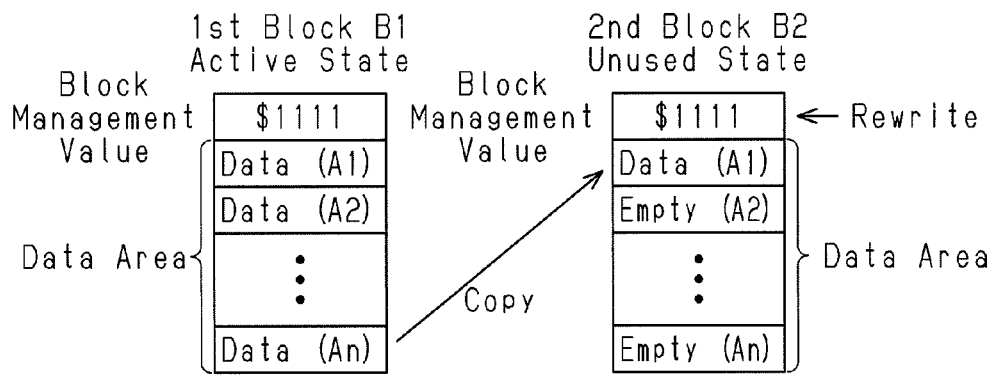

Under the above situation, referring to FIG. 3(b), when the flash memory device is reset while the second digit of "9" is being written, the copying of the third and fourth digits ("3" and "5") have been completed, and the remaining two digits of "9" and "1" have not been completed and are in an initial state of "F".

In this state, when reading the updated value after the power supply is activated again, the memory control unit 11 first reads the updated value of "53FF" from the second block B2 based on the greater one of the first and second block management values of the first and second block management areas. When the updated value includes an "F", the memory control unit 11 determines that the flash memory device has been reset when copying the updated value and complements the digits of "F" with the updated value of the first block B1. Thus, the memory control unit 11 reads the updated value in a correct order even when two blocks are indicated as being in an active state. As a result, a non-renewed updated value that differs from the true updated value is prevented from being erroneously read from the first block B1. This ensures that the true updated value is read.

The present embodiment has the advantages described below.

(1) When indicating an active state, the first to nth block management values stored in the first to nth block management areas are set as different values that gradually increase. More specifically, the first block management area of the first block B1 stores the first block management value of "$1111", and the first block management area of the second block B2 stores the second block management value of "$1112". Thus, even when there is more than one block in an active state, the updated value of the block having a greater block management value, namely, the second block B2 in the above example, is read. This allows for the true updated value to be read.

(2) When an updated value is copied from the first block B1 to the second block B2 and the updated value is renewed, the renewed true updated value is written to the second block B2. For example, when the flash memory device is reset during the copying, based on the block management values of the first and second blocks B1 and B2, the updated value of the second block B2 is read. Further, the updated value of the first block B1 is read to complement regions to which the updated value has not been copied. In the example of FIG. 3(b), the first and second digits of the updated value in the second block B2 are the regions in which copying has not been completed, and the updated value of the first block B1 is used for these regions. Thus, the true updated value can be read even when the flash memory device is reset after copying the renewed region (third digit in FIG. 3(b)).

(3) After the second block management value is written to the second block management area of the second block B2, the first block management value indicative of an active state and stored in the first block management area of the first block B1 is rewritten to a block management value indicating an unused state, and the data of the first block B1 is erased. Accordingly, only one block is normally in an active state. This reduces the number of processes that compare the block management values.

(4) When an updated value is written to the n−1th data area An-1 of the first block B1 and the next updated value is too large and cannot be stored in the nth data area An, this updated value is written to the second block B2. Under this situation, when the flash memory device is reset after copying is completed, the first and second blocks B1 and B2 have different updated values. Even in such a case, the updated value of the second block B2 is correctly read based on the relationship of first and second block management values stored in the first and second block management areas.

(5) Even when two blocks have the same updated value, the same process can always be performed when using a priority order based on the relationship of the first and second block management values stored in the first and second block management areas like in the above embodiment.

It should be apparent to those skilled in the art that the present invention may be embodied in many other specific forms without departing from the spirit or scope of the invention. Particularly, it should be understood that the present invention may be embodied in the following forms.

In the above embodiment, the relationship of the first and second block management values stored in the first and second block management areas is determined with the first digit. Instead, other digits may be sequentially increased in sequential numbers for the blocks.

The first to nth block management values do not have to be sequential numbers as long as they increase in order. For example, the first to nth block management values may be increased by two, such as "$1111", "$1113", "$1115", and so on.

The first to nth block management values may be set to sequentially decrease. For example, when the block management value of "$111F" is set to the first block management area, the block management value of "$111E" is set to the second block management area. In this manner, when sequentially decreasing the block management value, the block management values do not have to be sequential numbers as previously mentioned. In this case, when the flash memory device is reset and then there is more than one block in an active state, the memory control unit 11 reads the updated value from the second block B2 having the smaller block management value. This allows for the true updated value to be read in the same manner as the above embodiment.

Further, as long as the block management values are set based on a predetermined rule, the block management values may be sequentially increased or decreased. For example, the first block management value of the first block management area may be set to "$1111", the second block management value of the second block management area may be set to "$1115", and the third block management value of the third block management area may be set to "$1113". In this case, in accordance with the predetermined rule, the block management values can be compared to read the true updated value.

In the above embodiment, the first to nth block management values "$1111" to "$111F" are allocated in an active state, and the block management value "$FFFF" is allocated in an unused state. However, the allocation is not limited in such a manner. For example, a block management value of "$0000" may be allocated in an unused state, and first to nth block management values of "$0001" to "000F" may be allocated in an active state.

In the above embodiment, as shown in the lower part of FIG. 2, the memory control unit 11 copies the updated value of the first block B1 to the first data area A1 of the second block B2. Then, the memory control unit 11 erases the data stored in the first block B1 and rewrites the block management value indicative of an active state and stored in the block management area to a block management value indicating an unused state. However, the erasing of data and the rewriting of the block management value to an unused state may be omitted. In this case, more than one block is in an active state. However, in the same manner as in the above embodiment, the true updated value can be read based on the relationship of the block management values. This configuration is effective when storing more past updated values.

The present examples and embodiments are to be considered as illustrative and not restrictive, and the invention is not to be limited to the details given herein, but may be modified within the scope and equivalence of the appended claims.

The invention claimed is:

1. A flash memory device, comprising:
a flash memory including a data region that stores data; and
a memory controller that forms a plurality of blocks, including a first block and a second block, in the data region of the flash memory, wherein
the memory controller writes to the first block an updated value of the data and a first block management value indicating whether the first block is in a used state,
when the first block is in an unused state, the memory controller writes the updated value of the data and the first block management value to the first block, sequentially recognizes updated values of the data, and writes an updated value of the updated values to the first block when each of the updated values is recognized, when the first block becomes full, the memory controller copies the updated value, which is written at the end of the updated values written to the first block, from the first block to the second block and writes a second block management value to the second block, the memory controller sets and writes a plurality of different block management values, including the first and second block management values, respectively, to the plurality of blocks based on a predetermined rule, and the memory controller compares the plurality of block management values to read the updated value of the data as a true updated value from the second block, wherein the predetermined rule sets the plurality of block management values, respectively, as different values that sequentially increase or decrease, and the memory controller determines, when more than one of the plurality of blocks is in the used state, that the updated value of the block storing the largest or smallest one of the block management values is a true updated value.

2. The flash memory device according to claim 1, wherein when the updated value is renewed as the memory controller copies the updated value of the first block to the second block, the memory controller rewrites the updated value copied to the second block with the renewed updated value.

3. The flash memory device according to claim 1, wherein the memory controller:

compares the first block management value and second block management value to read the updated value from the second block when the flash memory device is reset during the copying, determines whether the copying of the updated value from the first block to the second block has been completed in accordance with the read updated value, and rewrites the updated value of the second block to the updated value of the first block when determining that the copying of the updated value has not been completed.

4. The flash memory device according to claim 1, wherein after the memory controller writes the second block management value to the second block, the memory controller writes the block management value to the first block to indicate that the first block is unused and erases the data of the first block.

5. The flash memory device according to claim 1, wherein each of the blocks includes a plurality of data areas, and the memory controller stores the data in each of the data areas.

6. The flash memory device according to claim 1, wherein each block management value of the plurality of block management values indicates whether a block storing the block management value is in a used state and whether the block storing the block management value stores the updated value to be read as a true updated value.

7. The flash memory device according to claim 1, wherein the first block management value does not change while the updated values are sequentially recognized and written in the first block.

8. The flash memory device according to claim 1, wherein, while the updated values are sequentially recognized and written in the first block, an earlier written updated value of the updated values is not erased.

9. The flash memory device according to claim 1, wherein, when the first block becomes full, an updated value of the updated values sequentially recognized and written in the first block other than the updated value written at the end of the updated values is not copied from the first block to the second block.

* * * * *